United States Patent [19]
Buchanan, Jr.

[11] Patent Number: 5,644,869
[45] Date of Patent: Jul. 8, 1997

[54] POWER DRIVE FOR A MOVABLE CLOSURE WITH BALL NUT DRIVE SCREW

[75] Inventor: Harry C. Buchanan, Jr., Spring Valley, Ohio

[73] Assignee: ITT Automotive Electrical Systems, Inc., Auburn Hills, Mich.

[21] Appl. No.: 575,823

[22] Filed: Dec. 20, 1995

[51] Int. Cl.⁶ .............................. E05F 11/34; E05F 15/00
[52] U.S. Cl. ................................................. 49/362; 49/280
[58] Field of Search ........................... 49/362, 360, 280

[56] References Cited

U.S. PATENT DOCUMENTS

| | | |
|---|---|---|
| 3,334,443 | 8/1967 | Eskra et al. . |
| 3,462,883 | 8/1969 | Reeks et al. . |
| 3,533,188 | 10/1970 | Jones et al. . |
| 3,653,154 | 4/1972 | Hayday . |
| 3,662,491 | 5/1972 | Boyriven . |
| 3,785,089 | 1/1974 | Smith . |
| 3,872,622 | 3/1975 | Berk ...................................... 49/360 X |
| 3,874,117 | 4/1975 | Boehm . |
| 4,050,189 | 9/1977 | Peterson . |
| 4,152,872 | 5/1979 | Tanizaki et al. . |
| 4,157,846 | 6/1979 | Whitcroft . |
| 4,234,833 | 11/1980 | Barrett . |
| 4,248,016 | 2/1981 | Pecchioni . |
| 4,313,281 | 2/1982 | Richmond . |
| 4,330,960 | 5/1982 | Hasemann et al. . |
| 4,462,185 | 7/1984 | Shibuke et al. . |
| 4,464,863 | 8/1984 | Chikaraishi et al. . |
| 4,471,251 | 9/1984 | Yamashita . |
| 4,503,638 | 3/1985 | Schindehutie . |
| 4,529,920 | 7/1985 | Yoshida et al. . |
| 4,530,185 | 7/1985 | Moriya et al. . |
| 4,563,625 | 1/1986 | Kornbrekke et al. . |
| 4,612,729 | 9/1986 | Sato . |
| 4,617,757 | 10/1986 | Kagiyama et al. . |
| 4,640,050 | 2/1987 | Yamagishi et al. . |
| 4,644,692 | 2/1987 | Schindehutte . |
| 4,702,514 | 10/1987 | Perry . |
| 4,738,052 | 4/1988 | Yoshida . |
| 4,753,039 | 6/1988 | Jeuffray et al. . |
| 4,769,584 | 9/1988 | Irigoyen et al. . |
| 4,794,731 | 1/1989 | Willmott et al. . |
| 4,801,172 | 1/1989 | Townsend . |
| 4,852,422 | 8/1989 | Mori . |
| 4,862,640 | 9/1989 | Boyko et al. . |
| 4,881,018 | 11/1989 | Kato et al. . |
| 4,887,390 | 12/1989 | Boyko et al. . |
| 4,914,859 | 4/1990 | Gionet et al. . |
| 4,916,861 | 4/1990 | Schap . |
| 4,922,168 | 5/1990 | Waggamon et al. . |
| 4,965,502 | 10/1990 | Ogasawara . |
| 4,967,083 | 10/1990 | Kornbrekke et al. . |
| 4,983,963 | 1/1991 | Hodgetts et al. . |
| 4,984,385 | 1/1991 | DeLand . |
| 5,004,280 | 4/1991 | Schap . |
| 5,025,591 | 6/1991 | DeLand et al. . |

(List continued on next page.)

*Primary Examiner*—Philip C. Kannan
*Attorney, Agent, or Firm*—Thomas N. Twomey; J. Gordon Lewis

[57] ABSTRACT

A power drive moves a movable closure between an open position and a closed position with respect to a portal defining a passage through a barrier. The power drive can include an elongated drive member connected to the movable closure and a ball nut drive assembly for selectively moving the drive member longitudinally to position the movable closure between the open position and the closed position with respect to the passage through the barrier. The barrier can define at least a portion of a stationary structure or a vehicle, where the passage allows access within the structure or the vehicle. The movable closure can include a sliding door, hatch, window, roof panel or the like. The elongated drive member can be a compound drive member having at least one gear or tooth-like member extending helically around in uniformly spaced turns about a core of the drive member to form a rigid or resilient screw-like portion capable of being driven by operable engagement with the recirculating ball nut drive assembly. A flexible portion, such as a push/pull cable can be attached to one end of the screw-like member to allow the power drive to move a movable closure along a curved or other non-linear path.

29 Claims, 4 Drawing Sheets

U.S. PATENT DOCUMENTS

| | | |
|---|---|---|
| 5,039,925 | 8/1991 | Schap . |
| 5,046,283 | 9/1991 | Compeau et al. . |
| 5,062,241 | 11/1991 | DeLand . |
| 5,063,710 | 11/1991 | Schap . |
| 5,066,056 | 11/1991 | Schap . |
| 5,069,000 | 12/1991 | Zuckerman . |
| 5,076,016 | 12/1991 | Adams et al. . |
| 5,077,938 | 1/1992 | Moreuil . |
| 5,105,131 | 4/1992 | Schap . |
| 5,138,795 | 8/1992 | Compeau et al. . |
| 5,140,316 | 8/1992 | DeLand et al. . |
| 5,142,152 | 8/1992 | Boiucaner . |
| 5,142,823 | 9/1992 | Brandenburg et al. . |
| 5,155,937 | 10/1992 | Yamagishi et al. . |
| 5,172,947 | 12/1992 | Schap . |
| 5,189,839 | 3/1993 | DeLand et al. . |
| 5,203,112 | 4/1993 | Yamagishi et al. . |
| 5,233,789 | 8/1993 | Priest et al. . |
| 5,247,763 | 9/1993 | Hein . |
| 5,253,452 | 10/1993 | Goldbach . |
| 5,263,762 | 11/1993 | Long et al. . |
| 5,280,754 | 1/1994 | Flanagan et al. . |
| 5,282,663 | 2/1994 | Horton . |
| 5,285,596 | 2/1994 | Kinsey . |
| 5,316,365 | 5/1994 | Kuhlman et al. . |
| 5,319,880 | 6/1994 | Kuhlman . |
| 5,319,881 | 6/1994 | Kuhlman . |
| 5,319,990 | 6/1994 | Veale et al. ............ 49/362 X |
| 5,322,339 | 6/1994 | Dubernard . |
| 5,323,570 | 6/1994 | Kuhlman et al. . |
| 5,325,628 | 7/1994 | Yingling . |
| 5,347,755 | 9/1994 | Jaster et al. . |
| 5,361,540 | 11/1994 | Rogers, Jr. et al. . |
| 5,383,304 | 1/1995 | Codina Soley . |
| 5,389,920 | 2/1995 | DeLand et al. . |
| 5,421,395 | 6/1995 | Horn . |
| 5,422,552 | 6/1995 | Parisi . |

POWER DRIVE FOR A MOVABLE CLOSURE WITH BALL NUT DRIVE SCREW

RELATED APPLICATIONS

This application is related to U.S. patent application Ser. No. 08/501,557 filed Jul. 12, 1995 for "Acceleration Reaction Clutch With Override Capability" and application Ser. No. 08/575,472 filed contemporaneously herewith for "Power Drive For A Movable Closure With Ball Nut Driven Flexible Cable" and application Ser. No. 08/575,644 filed contemporaneously herewith for "Power Striker With Inertially Activated Impact Cycle".

FIELD OF THE INVENTION

The present invention relates to a power drive system for driving a movable closure such as a sliding door, hatch or window in movement with respect to a portal defining a passage through a barrier between an open position and a closed position, and more particularly, to a ball nut drive unit for selectively applying linear movement to a drive member, such as a compound drive member having a rigid screw-like portion and a flexible portion connected to the movable closure.

BACKGROUND OF THE INVENTION

It is generally known to provide a power drive system for driving a sliding door in movement between an open position and a closed position, where the drive arrangement accommodates shifting between manual operation and positively driven powered operation of the door at any position along its path of movement while providing a control responsive to an overload to stop door movement in the event an object is trapped by the closing door. These types of power drive systems are especially well adapted for use in operating the sliding door of a van-type vehicle. Typically, a power drive system is capable of driving an output member coupled to the door to drive the door in either direction over a relatively long working stroke. The coupling between the output member and the door can take the form of a positive mechanical interconnection between the motor and the door operable in either direction of movement as required. Additional problems may be presented where the power drive system is to power the sliding door of a van-type vehicle over and above the foregoing considerations applicable to sliding doors in general.

The power drive system for a sliding door in a van-type vehicle application is conventionally mounted on either longitudinally extending side of the van and the system may be operated by control switches accessible from the driver's seat. However, there are many occasions where the driver may desire to open or close the door manually, such as when the driver is outside the van loading or unloading articles through the sliding door and the controls are out of reach. A positively mechanically linked connection between the door and the power source will interfere with manual operation of the door and may disturb a relationship between the door and drive relied on by the control system to sense the position of the door along its path of travel.

Translation of a vehicle door requires an efficient set of machine elements and clutches to allow the door to overhaul the system. Yet the driving system must drive efficiently and not offer a significant resistance when being overhauled. A soft coupling may be employed to assure system loads remain in the range of acceptable machine element loads. A ball nut is a highly efficient machine element when used with a ball screw. However, the ball screw is rigid and expensive when used in applications requiring significant travel, while generally being incapable of accommodating movement along any path that is not linear.

SUMMARY OF THE INVENTION

The present invention provides a high lead ball screw and engaging clutch assembly with a flexible cable portion connected to one end of the screw to assure operation in curved areas. The present invention provides the desired reversibility, manual operation and overrides for straight and curved operation. A clutch with a locking mechanism can be provided between the motor and driving member to allow free reversal and alternate locking means. The flexible cable is attached to the end of the rigid screw allowing the device to drive a sliding door in a curved track. The intended use is in power operated and manual operated sliding doors for vehicles, such as vans. However, it should be recognized that the present invention can be adapted for use in any movable closure application, including sliding doors, hatches, roof panels, windows or the like, in a stationary structure, such as a building, or in a vehicle, such as a van.

An electric motor drives through a clutch assembly with optional lock mechanism and through a gear set. The gear set drives an Acme, square or ball nut screw with nut actuator to provide linear reversible motion. A flexible portion of the drive member is connected or attached to the rigid screw-like portion of the drive member to drive an automotive van-type sliding door through a track and sheath portion of a non-straight section of sliding door travel. The present invention can be used for non-automotive applications, such as commercial buildings and homes. A storage sheath is provided on an opposite end of the drive nut from the sliding door to maintain quiet operation. The motor and clutch can be configured as a through motor construction with or without the clutch assembly. A hollow shaft can allow clearance for the ball or Acme threaded screw.

The door drive system according to the present invention uses a push/pull cable connected at one end to the movable closure, such as a door, and guided in longitudinal movement within a guide track which extends parallel to the path of movement of the door with respect to the portal or door opening. The cable is driven in longitudinal movement by a reversible electric motor controlled by an electronic control unit in a manner such that the door may be automatically stopped in response to sensing of an overload, such as the jamming of an object between the closing door and the door frame, or providing for express operation and cancellation.

A screw-like member can include a helically extending gear tooth in uniformly spaced turns around a core defining a single lead, double lead, triple lead or other multiple lead thread or tooth as desired for the particular application. A 45° lead is preferable with a lead angle in a range of between 20° and 70° inclusive. A ball nut drive means is rotatably mounted within a housing fixed to surrounding stationary structure or frame for engaging and selectively moving the drive member longitudinally to position the movable closure between the open position and the closed position with respect to a portal defining a passage through a barrier, such as a wall, roof or the like of a vehicle or building. The screw-like portion of the drive member is threaded through a recirculating ball nut drive assembly disposed within a housing for rotation in order to longitudinally drive the drive member in either longitudinal direction in response to rotation of the recirculating ball nut drive assembly with respect to the housing. The recirculating ball nut drive assembly can include a plurality of gear teeth formed on an external periphery thereof for intermeshing engagement with a drive gear. The drive gear can be connected through a resilient rotational coupling to an overrunning clutch assembly. The drive shaft of a reversible electric motor can be connected to the clutch assembly for driving the drive gear in either rotational direction to produce longitudinal movement of the screw-like portion of the drive member in either longitudinal direction.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED AND ALTERNATIVE EMBODIMENTS

Figure 1:
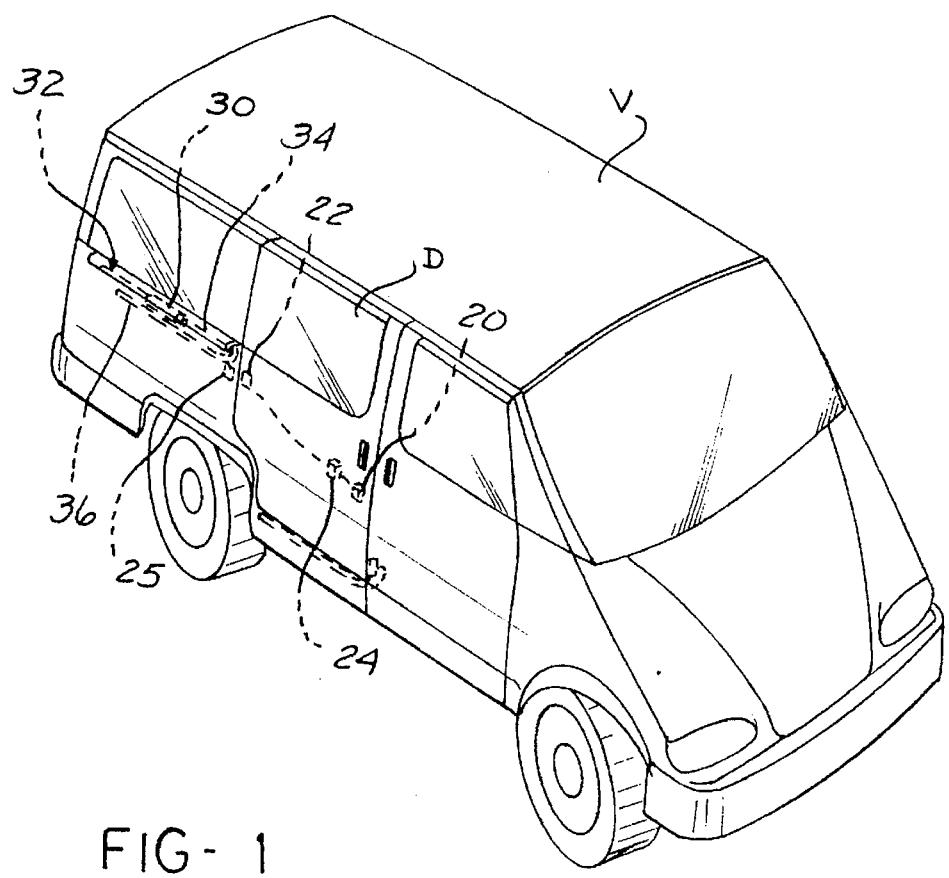
FIG. 1 is a perspective view of a barrier, such as a wall of a van, with certain parts broken away, showing the general location of certain components of the present invention within a vehicle.
Figure 2:
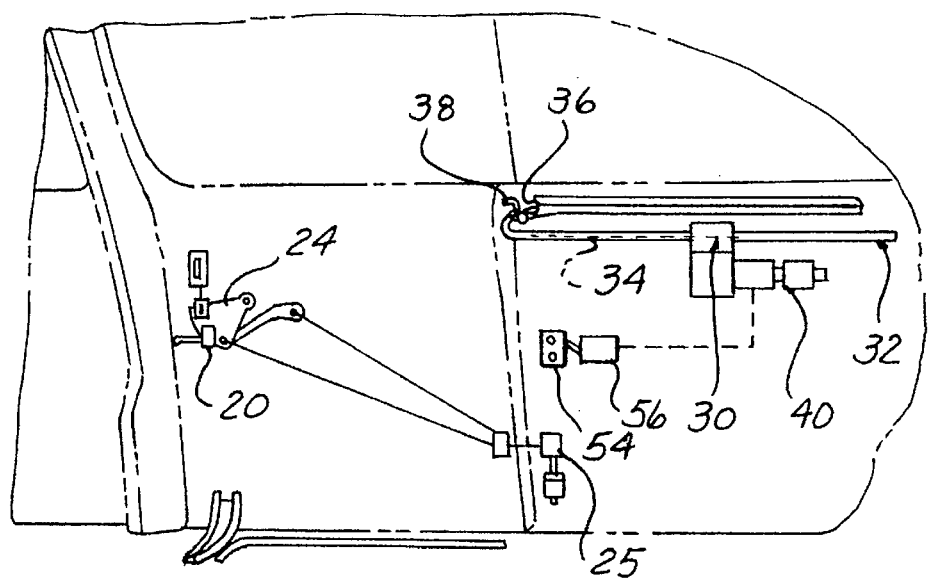
FIG. 2 is a perspective view of a portion of the interior of the van of FIG. 1 with certain parts broken away or omitted.

In FIGS. 1 and 2, there is shown a barrier, such as a wall of a vehicle, such as a van V having a movable closure, such as a sliding door D located on at least one side of the vehicle. Vans using such sliding doors have been available for years and the structural arrangements by which the door is mounted on the vehicle for manual movement between the closed position shown in FIGS. 1 and 2 in which the door is sealingly seated in a door opening and an open position in which the door is disposed at the side of the van rearwardly of the door opening is well known. In the standard arrangement, the door is latched in its closed position, typically by mechanical latches 20 and 22 at the front and rear edges of the door, the latches being mechanically linked to a latch actuator 24 mounted within the door to be simultaneously released by manual actuation of appropriate door handles. In many cases, the rear latch 22 may include a power driven striker mechanism 25 which is latchingly engaged with the door as it approaches its closed position and is power driven to move the latched door to its fully closed position.

The present invention is directed to certain components of a power drive system by means of which a movable closure, such as a sliding door, hatch, roof panel, window or the like can be power driven in either direction between its open and closed positions. The power drive system includes a motor driven gearbox 30 which is selectively operable to drive an elongate drive member 34, such as a compound drive member having a flexible push/pull cable portion and a rigid or resilient screw-like portion, in forward and rearward sliding movement within a cable guide track designated generally 36 fixedly mounted with respect to a portal on the vehicle frame to extend parallel to at least one edge of the door opening or passage along a path parallel to the path of movement of the door between its open and closed positions. The flexible end of the compound drive member 34 is operably coupled to the movable closure at a conventional door mounting bracket 38 so that power driven movement of the flexible drive member portion or cable 34 forwardly and rearwardly through the guide track 36 drives the door D between its open and closed position. The coupling arrangement between cable 34 and door D is such that initial movement of cable 34 in a door opening direction is transmitted to latch release mechanism 24 to release the door latches or an electro-mechanical actuator is implemented to open the door in response to a signal from the control unit 56.

The elongated compound drive member 34 extends along a length of the vehicle with the flexible portion extendible along the guide track 36, and with the resilient screw-like portion passing entirely through gearbox 30 and extending from the gearbox into a storage housing 32. The resilient portion of the drive member 34 can be fed into storage housing 32 during closing movement of drive member 34 and can be withdrawn from housing 32 during rearward movement. Gearbox 30 and housing 32 may conveniently be mounted in the vehicle wall adjacent the external guide track for the door as schematically illustrated in FIG. 2. The motor 40 which drives member 34 via gearbox 30 is a reversible motor controlled by appropriate directional switches 54 which may be mounted at least on the vehicle dash within reach of the driver's seat, the switches 54 being operatively connected to motor 40 via an electronic control unit 56. Parallel connected control switches may be mounted at other locations on the vehicle, if desired.

The employment of an electronic control unit enables the power drive for the door to be operated in a safe and efficient manner, as by providing the door with an anti-pinch capability by automatically stopping the drive if an object becomes trapped between the closing door and the door frame, providing for express operation and eliminating the need for limit switches to sense specific door positions. Electronic control units capable of being programmed to perform these, and similar functions, are well known and commercially available from a variety of sources.

Figure 3:
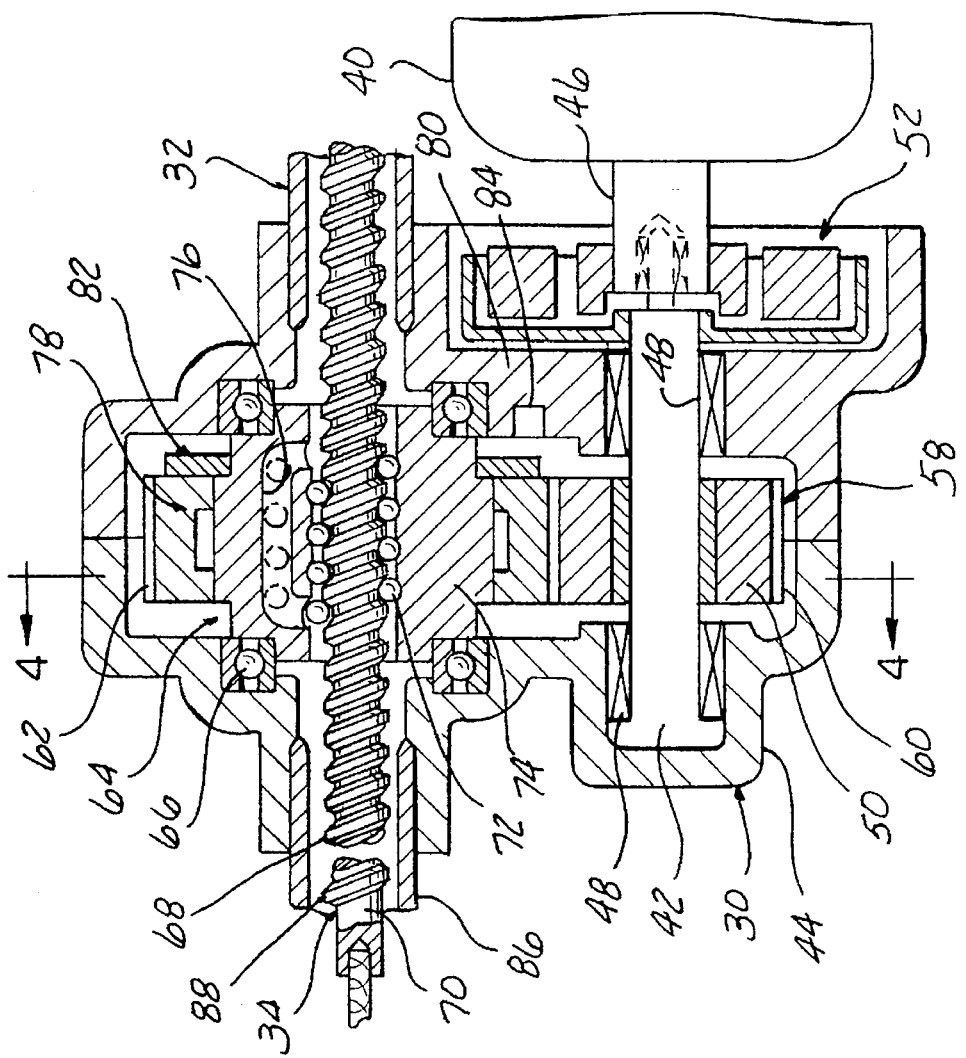
FIG. 3 is a cross-sectional view of a ball nut drive means according to the present invention.
Figure 4:
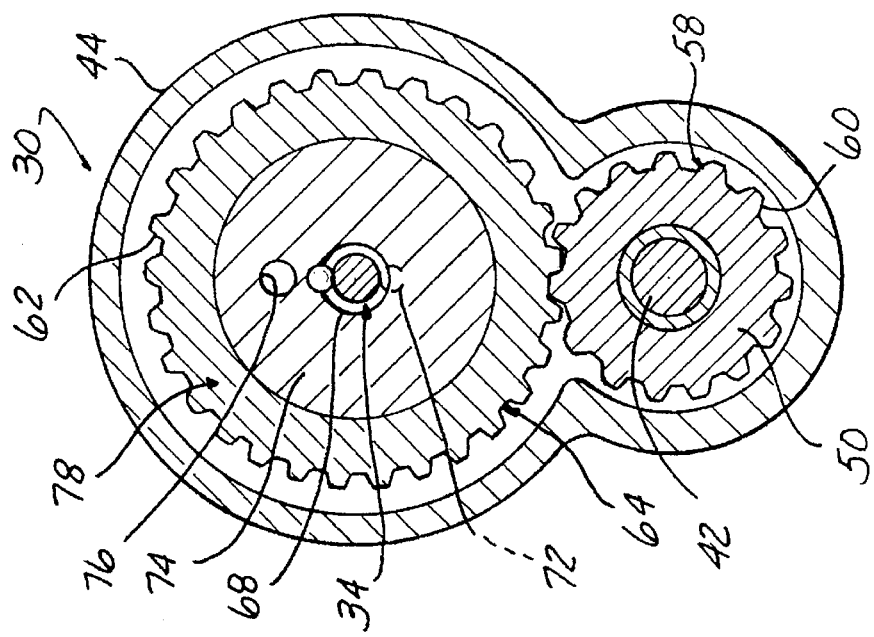
FIG. 4 is a cross-sectional view of the power drive according to the present invention taken as shown in FIG. 3.

Details of the motor driven gearbox 30 can best be seen in FIGS. 3–4. The reversible motor 40 is resiliently mounted with respect to the gearbox 30 with a shaft 46 projecting outwardly from the motor 40 into engagement with clutch means 52 for allowing the door to overhaul the power drive system during manual operation, and for transmitting rotary power through the clutch means 52 to drive the door between the open and closed positions during power operations. An example of a suitable clutch means 52, by way of example and not limitation, is disclosed and illustrated in U.S. patent application Ser. No. 08/501,557 filed Jul. 12, 1995, for "Acceleration Reaction Clutch With Override Capability", which is incorporated by reference herein.

An output shaft 42 is connected to the clutch means 52 for transferring rotary output power to a pinion gear or driving gear 58. The shaft 42 extends within a housing 44 and is supported for rotation by bearings 48 with respect to the housing 44. The shaft 42 is resiliently coupled to a hub 50 of the driving gear 58 for rotation therewith. The driving or pinion gear 58 includes a plurality of first gear teeth 60 intermeshingly engaged with a plurality of second gear teeth 62 connected to ball nut drive means 64. The ball nut drive means 64 is rotatably disposed within the housing 44 by bearings 66 for selectively moving the drive member 34 longitudinally to position the movable closure or sliding door between the open and closed positions with respect to the portal defining the passage through the barrier. The barrier is a construction forming an extended indefinite surface preventing or inhibiting the passage of persons or things, and can include a wall, ceiling, roof or cover for a stationary structure or a movable vehicle, such as the van V. The portal is structure defining an opening through the barrier for passage of persons or things, such as the framing of a door, window, hatch or roof panel opening. The movable closure is an obstructive structure whose presence in or before a passage bars traffic through the passage and is mounted to move in a regular, repetitive, predetermined path with respect to the portal so as to alternately open or close the passage, and can take the form of a hatch, a sliding window, a roof panel or a sliding door D. Linear movement motor means or motor driven gearbox 30 causes the drive element 34 to move in a substantially linear or unidirectional path which may be straight, curved, or tortuous. While the ball nut drive means 64 provides for reversing the direction of movement of the movable drive member 34, the drive member 34 is not pivoted substantially about the longitudinal axis of the elongated drive member 34 as the ball nut drive means 64 rotates with respect to the housing 44.

The drive member 34 preferably includes a rigid or resilient screw-like member portion extending along at least a portion of a longitudinal length of the drive member cooperatively engageable with the ball nut drive means 64. A portion of the drive member 34 may be covered by a drive sheath 86 at least partially between gearbox 30 and the sliding door D. Preferably, the drive member 34 also includes a flexible push/pull cable portion connectible to the sliding door at one end and connected to the screw-like portion at an opposite end by suitable means, such as crimping, silver soldering, welding, or a combination thereof. The screw-like member portion of drive member 34 can extend along a portion of a longitudinal length of the drive member 34 cooperatively engageable with the ball nut drive means 64. The screw-like member portion can be selected from a group including an acme threaded screw, an angled trapezoidal threaded screw and a square threaded screw. The screw-like portion includes helical gear teeth 68, operably engageable with a plurality of balls 72 for driving the drive member 34 longitudinally as the ball nut drive means 64 rotates with respect to the housing 44 in response to rotary power supplied by motor 40 through clutch means 52 and pinion gear 58. The plurality of balls 72 are recirculated longitudinally with respect to the ball nut 74 of the drive means 64 through ball return passage 76 as the ball nut 74 rotates with respect to the housing 44 on bearings 66.

The ball nut 74 can be formed with an overmolded gear 78 having the plurality of second gear teeth 62 connected to the ball nut 74 for rotation therewith. Gear means, such as pinion gear 58, drives the gear 78 in rotation about a longitudinal axis of the drive member 34. The gear 78 and pinion gear 58 can be formed with any desirable gear ratio for the particular application. Clutch means 52 connected to the gear means 58 provides for overrunning with respect to the gear means 58 in response to manual manipulation of the movable closure, or for slipping in response to the movable closure contacting an obstruction prior to reaching the open or closed position. Storage means 32 houses at least a portion of the drive member 34 opposite from the movable closure with respect to the ball nut drive means 64.

Sensing means 80 is responsive to rotary movement of the ball nut drive means 64 for transmitting to the electronic control unit 56 a signal representative of the location of the door D along the fixed path. The sensing means 80 can include a magnet 82 connected to the ball nut 74 for rotation therewith and a magnetic sensor 84 connected to the housing 44 for sensing the position of the magnet 82 as it passes by the sensor during rotation for transmitting to the electronic control unit 56 a signal representative of the location of the door along the fixed path of travel between the open and closed positions during manual and powered operations.

Figure 5:
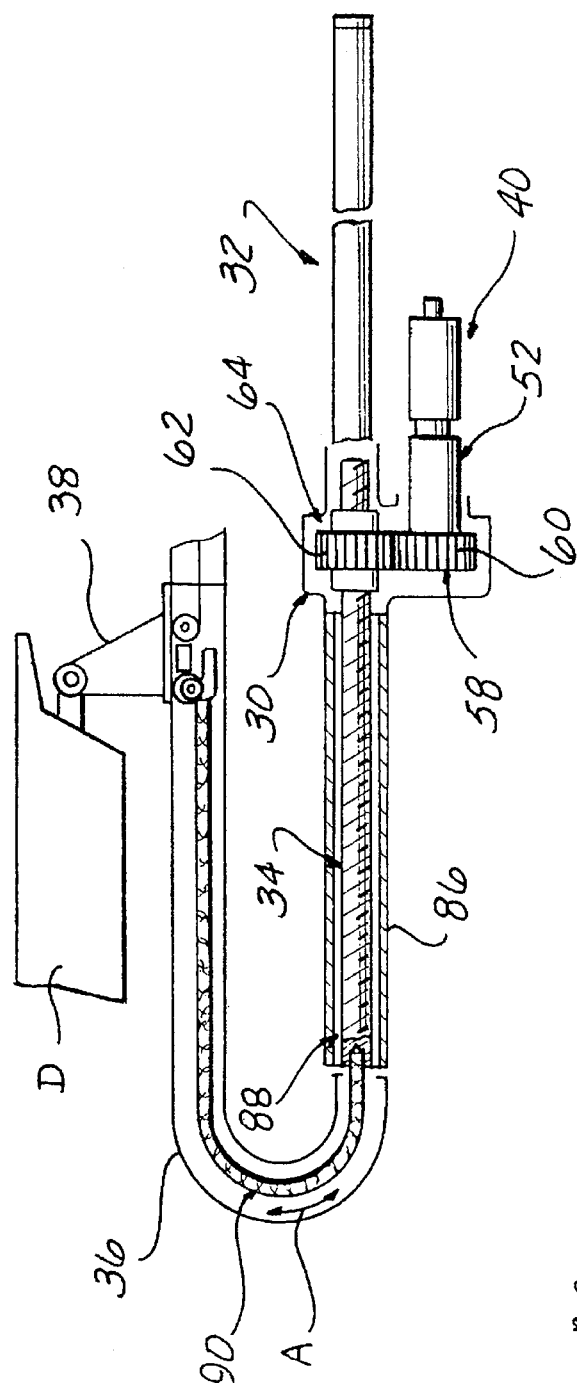
FIG. 5 is a cross-sectional view of an alternative power drive configuration according to the present invention connect to a movable closure.
Figure 6:
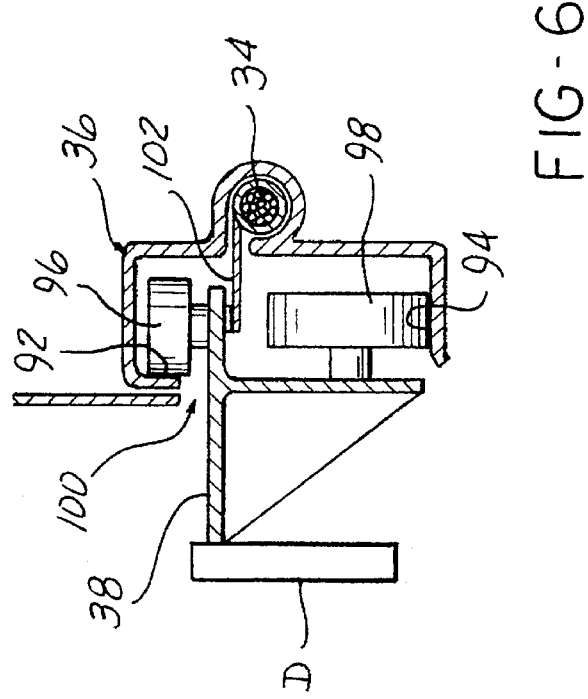
FIG. 6 is a cross-sectional detail of a guide track and bracket connected to the drive member according to the present invention.

Referring now to FIGS. 5–6, the power drive system according to the present invention in the preferred embodiment can include an elongated compound drive member 34 connected to the sliding door D through mounting bracket 38. The ball nut drive means 64 selectively moves the drive member 34 longitudinally to position the movable closure between the open and closed positions. The compound drive member 34 can include a rigid screw-like portion 88 extending longitudinally a sufficient distance to operably engage with the ball nut drive means 64 as the sliding door D moves between the open and closed positions, and a flexible portion 90 of the elongated compound drive member 34 connected between the sliding door D and the rigid screw-like portion 88. The motor 40 drives through clutch means 52, which may include an optional lock, through intermeshing first and second gear teeth, 60 and 62, driving an Acme, square or ball nut screw-like portion 88 through drive nut means 64 to provide linear reversible motion. Flexible cable portion 90 attaches to one end of the screw-like portion 88 to add a length of flexible cable 90 to drive an automotive van-type sliding door D through a track 36 and sheath 86 in a non-straight section to the left in the direction of arrow A as depicted in FIG. 5.

The present invention may also be adapted for use on non-automotive applications, such as commercial buildings and homes. A storage housing 32 or sheath is provided to maintain quiet operation. The present invention may also be adapted to employ a through motor configuration, such that the elongated drive member 34 extends through an aperture formed in the motor, such that the motor completely surrounds a portion of the drive member 34 while powering the sliding door D between the open and closed positions. The flexible portion 90 attached to the end of the screw-like portion 88 allows the present invention to drive a sliding door D along a curved or other non-linear track. The motor 40 can be adapted to use a through motor construction without a clutch. In the alternative, the motor 40 and clutch means 52 can be adapted to employ a through motor construction. In either case, a hollow shaft can be provided to allow clearance for the ball, or Acme threaded screw to power the sliding door D between the open and closed positions.

Figure 7:
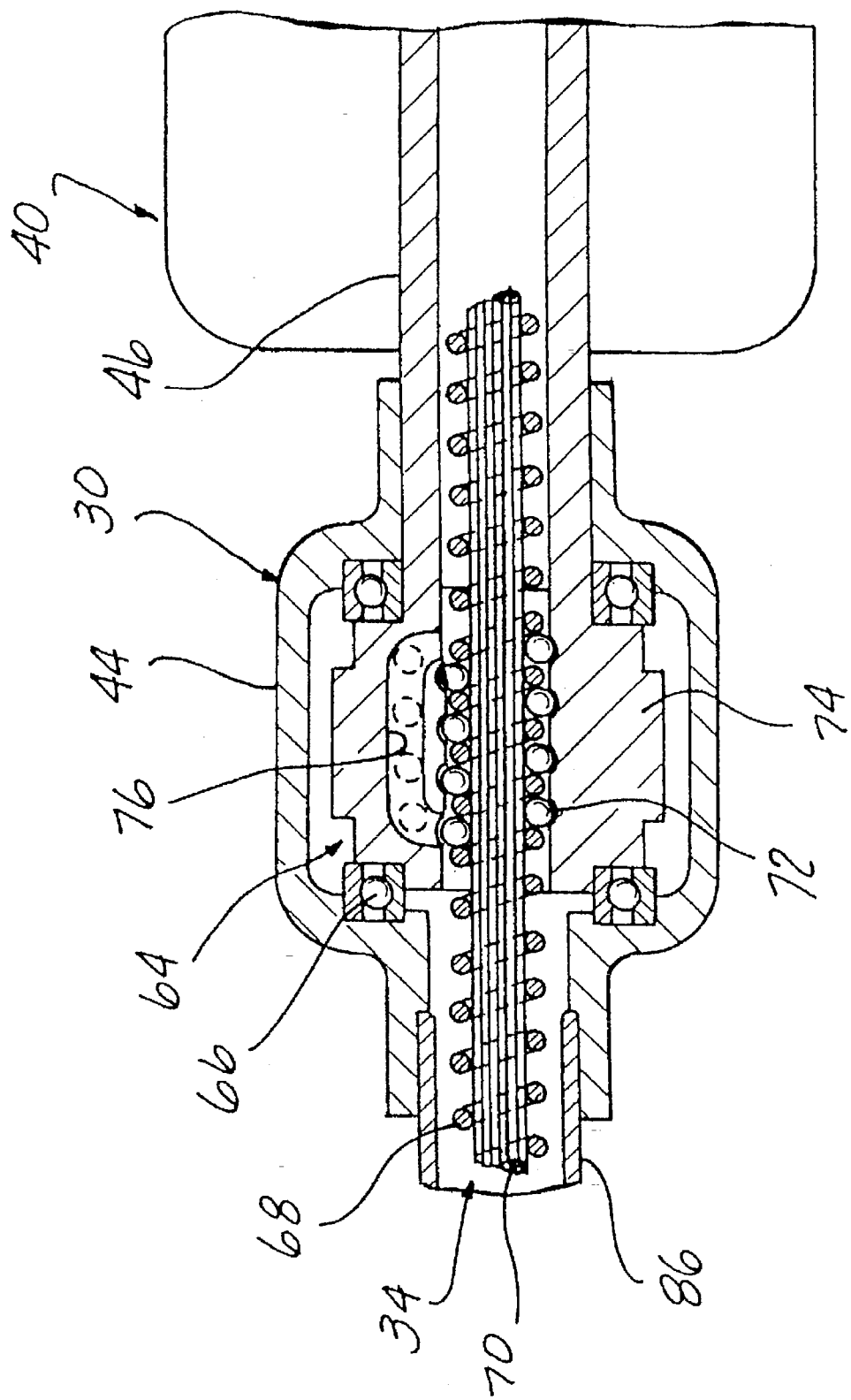
FIG. 7 is a cross-sectional view of a ball nut means according to the present invention.

Referring now to FIG. 7, the reversible motor 40 can have a hollow shaft 46 allowing passage of the drive member 34 through the shaft 46 and motor 40. The shaft 46 sheathes a portion of the drive member 34 passing therethrough, and is connected to the ball nut drive means 64. The shaft 46 can be directly connected to the ball nut 74, or can be connected through a clutch means 52 (not shown in FIG. 7). The drive member 34 can be a rigid screw-like member, or worm gear, or a flexible cable member having a flexible core 70 and at least one helically wound gear tooth 68 as previously described passing through the gear box 30 including the housing 44 and drive ball nut 74. The balls 72 within the ball nut 74 drivingly engage the gear tooth or teeth 68 of the drive member 34 to move the drive member 34 longitudinally in either direction. The drive member 34 can be sheathed along at least a portion of its longitudinal length. The balls 72 are recirculated through recirculating passageway 76. The ball nut drive means 64 is rotatably mounted on bearing 66 within the housing 44. This can permit freewheeling of the ball nut 74 and connected shaft 46 in response to manual manipulation of the movable closure or sliding door D.

Conventional bracket and roller assemblies are fastened to the respective upper and lower forward ends of the sliding door D. As best seen in FIGS. 5–6, bracket means 38 is operably connected to the movable closure, and can preferably be connected generally midway between the first and second edges as seen in FIG. 1. The conventional bracket and roller assemblies, and the bracket means 38, are slidingly supported in corresponding guide rails and guide means, such as cable guide track 36 respectively to guide the movable closure through opening and closing movements with respect to the barrier. The guide means or track 36 is connected to the barrier generally midway between the first and second guide tracks respectively, and operably engages the bracket means 38 for guiding the bracket means 38 along the fixed path between the opened and closed positions of the movable closure. Elongated means, such as drive member 34, is slidably disposed within the guide means 36 and connected to the bracket means 38 for driving the bracket means 38 along the fixed path. Translator means, such as motor 40, is operably engageable with the elongated means 34 for powering movement of the elongated means 34 and connected bracket means 38 with respect to the guide means 36 along the fixed path.

As best seen in FIG. 6, the rear guide means includes an elongated track or housing 36. The track 36 typically defines at least two surfaces 92 and 94 disposed at an angle with respect to one another engageable with rollers 96 and 98 respectively. The rollers 96 and 98 typically have axes of rotation that are disposed at an angle with respect to one another, generally corresponding to a 90° angle as illustrated in FIG. 6. In the illustrated embodiment of FIG. 6, the guide means or track 36 defines a slot 100 of sufficient dimension to permit the bracket means 38 to extend therethrough. The track 36 generally defines a first chamber for receiving the rollers 96 and 98, and a second chamber for slidably receiving the elongated means or drive member 34. The first and second chambers are in communication with one another longitudinally along the length of the track 36 allowing attachment of the bracket means 38 to the elongated means 34, such as by coupling member 102.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In a power drive system for a sliding door mounted on at least one side of a vehicle for sliding movement forwardly and rearwardly of the vehicle between an open position and a closed position, said system including reversible power drive means operable when actuated to selectively drive said door in opening or closing movement, the improvement comprising:

an elongated drive member connected to said sliding door; and ball nut drive means for selectively moving said drive member longitudinally to position said sliding door between said open and closed positions.

2. The power drive system of claim 1 wherein said ball nut drive means further comprises:

rotary motor means for driving said drive member in linear movement; and a recirculating ball nut operably connected to said rotary motor means and engaging said drive member for translating rotary motion of said motor means into linear motion of said drive member.

3. The power drive system of claim 2 further comprising:

said motor means having a hollow shaft allowing passage of said drive member therethrough; and said ball nut directly coupled to said hollow shaft of said motor means for linearly driving said drive member through said ball nut and hollow shaft.

4. The power drive system of claim 1 wherein said ball nut drive means further comprises:

gear means having a plurality of first gear teeth for driving said drive member longitudinally; and a ball nut having a gear with a plurality of second gear teeth connected to said ball nut for rotation therewith, such that said plurality of first and second gear teeth intermeshingly engage to drive said ball nut in rotation, said ball nut for translating rotation of said ball nut about a longitudinal axis of said drive member into linear movement of said drive member between said open and closed positions.

5. The power drive system of claim 4 further comprising:

clutch means connected to said gear means for overrunning with respect to said gear means in response to manual manipulation of said sliding door.

6. The power drive system of claim 5 further comprising:

electric motor means connected to said clutch means for driving said drive member in linear movement through said gear means and ball nut.

7. The power drive system of claim 1 further comprising:

reversible electric motor means for driving said drive member in linear movement to move said sliding door between said open and closed positions, said motor means connected to said ball nut drive means with said drive member extending through said motor means and said ball nut drive means.

8. The power drive system of claim 1 further comprising:

said elongated drive member having a flexible portion connected to said sliding door and a resilient screw-like portion extending longitudinally sufficiently to operably engage with said ball nut drive means as said sliding door moves between said open and closed positions, said screw-like portion selected from the group including an acme threaded screw, an angled trapezoidal threaded screw and a square threaded screw.

9. The power drive system of claim 1 further comprising:

storage means for housing at least a portion of said drive member opposite from said sliding door with respect to said ball nut drive means.

10. A sliding door system accommodating manual operation and powered operation of a sliding door in forward and rearward movement along a fixed path between an open position and a closed position, said system comprising:

an elongated drive member coupled to said door for longitudinal forward and rearward movement with said door; and ball nut drive means positively mechanically engaged with said drive member for rotation coordinated with longitudinal forward and rearward movement of said drive member.

11. The sliding door system of claim 10 further comprising:

a variable speed, reversible, electric motor means having a rotary output shaft connectible to said ball nut drive means for powering movement of said sliding door.

12. The sliding door system of claim 11 further comprising:

clutch means for positively mechanically coupling said output shaft to said ball nut drive means in response to rotation of said output shaft and for accommodating free rotation of said ball nut drive means relative to said output shaft for manual operation of said sliding door.

13. The sliding door system of claim 12 further comprising:

control means for selectively operating said motor and including an electronic control unit responsive to a signal representative of the location of said door along said fixed path to perform selected door control functions when said door is at selected locations along said fixed path.

14. The sliding door system of claim 13 further comprising:

sensing means responsive to rotary movement of said ball nut drive means for transmitting to said electronic control unit a signal representative of the location of said door along said fixed path.

15. The sliding door system of claim 10 wherein said ball nut drive means further comprises:

a recirculating ball nut having a plurality of gear teeth formed on an external periphery thereof for rotation therewith; and gear means for driving said recirculating ball nut in rotation about a longitudinal axis of said drive member.

16. The sliding door system of claim 10 further comprising:

said elongated drive member having a flexible portion connected to said sliding door and a rigid screw-like portion extending longitudinally sufficiently to operably engage with said ball nut drive means as said sliding door moves between said open and closed positions.

17. The sliding door system of claim 10 wherein said drive member further comprises a rigid screw-like member extending along at least a sufficient portion of a longitudinal length of said drive member to cooperatively engage with said ball nut drive means for moving said sliding door between said open and closed positions.

18. The sliding door system of claim 10 wherein said door defines a portal with respect to a vehicle and allows access within said vehicle when said door is in said open position.

19. The sliding door system of claim 10 further comprising:

storage means for housing at least a portion of said drive member opposite from said sliding door with respect to said ball nut drive means.

20. A power drive for moving a moveable closure between an open position and a closed position with respect to a portal defining a passage through a barrier comprising:

an elongated drive member coupled to said moveable closure for longitudinal forward and rearward movement with said moveable closure, said drive member including a flexible push/pull cable portion and a rigid screw-like member portion having at least one gear tooth extending helically in uniformly spaced turns about an elongated core member over a portion of a longitudinal length of said drive member;

recirculating ball nut drive means positively mechanically engaged with said drive member for rotation coordinated with longitudinal forward and rearward movement of said drive member, wherein said recirculating ball nut drive means includes a recirculating ball nut having a plurality of gear teeth formed on an external periphery thereof for rotation therewith, said rigid screw-like member portion extending longitudinally sufficiently to cooperatively engage with said ball nut drive means for driving said moveable closure between said open and closed positions;

a variable speed, reversible, electric motor means having a rotary output shaft for powering movement of said moveable closure;

gear means connected to said rotary output shaft and intermeshing with said gear teeth of said recirculating ball nut for driving said recirculating ball nut in rotation about a longitudinal axis of said drive member;

clutch means for positively mechanically coupling said output shaft to said ball nut drive means in response to rotation of said output shaft and for accommodating free rotation of said ball nut drive means relative to said output shaft for manual operation of said moveable closure;

control means for selectively operating said motor means and including an electronic control unit responsive to a signal representative of the location of said moveable closure along said fixed path to perform selected control functions when said moveable closure is at selected locations along said fixed path; and sensing means responsive to rotary movement of said recirculating ball nut drive means for transmitting to said electronic control unit a signal representative of the location of said moveable closure along said fixed path.

21. In a power drive for moving a moveable closure between an open position and a closed position with respect to a portal defining a passage through a barrier, the improvement comprising:

an elongated drive member connected to said moveable closure; and ball nut drive means for selectively moving said drive member longitudinally to position said moveable closure between said open and closed positions.

22. The power drive of claim 21 wherein said ball nut drive means further comprises:

rotary motor means for driving said drive member in linear movement; and a recirculating ball nut operably connected to said rotary motor means and engaging said drive member for translating rotary motion of said motor means into linear motion of said drive member.

23. The power drive of claim 22 further comprising:

said motor means having a hollow shaft allowing passage of said drive member therethrough; and said ball nut directly coupled to said hollow shaft of said motor means for linearly driving said drive member through said ball nut and hollow shaft.

24. The power drive of claim 21 wherein said ball nut drive means further comprises:

gear means having a plurality of first gear teeth for driving said drive member longitudinally; and a ball nut having a gear with a plurality of second gear teeth connected to said ball nut for rotation therewith, such that said plurality of first and second gear teeth intermeshingly engage to drive said ball nut in rotation, said ball nut for translating rotation of said ball nut about a longitudinal axis of said drive member into linear movement of said drive member between said open and closed positions.

25. The power drive of claim 24 further comprising:

clutch means connected to said gear means for overrunning with respect to said gear means in response to manual manipulation of said moveable closure.

26. The power drive of claim 25 further comprising:

electric motor means connected to said clutch means for driving said drive member in linear movement through said gear means and ball nut.

27. The power drive of claim 21 further comprising:

reversible electric motor means for driving said drive member in linear movement to move said moveable closure between said open and closed positions, said motor means connected to said ball nut drive means with said drive member extending through said motor means and said ball nut drive means.

28. The power drive of claim 21 further comprising:

said elongated drive member having a flexible portion connected to said moveable closure and a resilient screw-like portion extending longitudinally sufficiently to operably engage with said ball nut drive means as said moveable closure moves between said open and closed positions, said screw-like portion selected from the group including an acme threaded screw, an angled trapezoidal threaded screw and a square threaded screw.

29. The power drive of claim 21 further comprising:

storage means for housing at least a portion of said drive member opposite from said moveable closure with respect to said ball nut drive means.

* * * * *